United States Patent [19]
Erickson

[11] Patent Number: 5,771,710
[45] Date of Patent: Jun. 30, 1998

[54] THERMOSYPHON COOLED ABSORBER FOR AIR COOLED ABSORPTION CYCLES

[75] Inventor: Donald C. Erickson, Annapolis, Md.

[73] Assignee: Gas Research Institute, Chicago, Ill.

[21] Appl. No.: 736,028

[22] Filed: Oct. 23, 1996

Related U.S. Application Data

[63] Continuation of Ser. No. 406,159, Mar. 17, 1995.

[51] Int. Cl.⁶ .............................. F25B 37/00; F25B 15/00
[52] U.S. Cl. ................................ 62/494; 62/476; 62/485; 165/104.12
[58] Field of Search .......................... 62/101, 103, 324.2, 62/476, 485, 489, 494; 165/104.11, 104.12, 104.21

[56] References Cited

U.S. PATENT DOCUMENTS

| | | |
|---|---|---|
| 1,849,685 | 3/1932 | Munters ..................................... 62/101 |
| 1,882,026 | 10/1932 | Munters ..................................... 62/101 |
| 1,976,202 | 10/1934 | Thomas ..................................... 62/485 |
| 2,069,865 | 2/1937 | Ullstrand ................................... 62/103 |
| 2,278,998 | 4/1942 | Kögel ........................................ 62/485 |
| 2,446,636 | 8/1948 | Coons . |
| 2,452,835 | 11/1948 | Coons . |
| 3,481,150 | 12/1969 | English . |
| 3,514,971 | 6/1970 | McNeely . |
| 3,690,121 | 9/1972 | Patel . |
| 3,742,726 | 7/1973 | English . |
| 4,106,309 | 8/1978 | Phillips . |
| 4,127,010 | 11/1978 | Phillips . |
| 4,311,019 | 1/1982 | Rojey et al. . |
| 4,567,736 | 2/1986 | van der Sluys et al. . |
| 4,573,330 | 3/1986 | van der Sluys et al. . |
| 4,688,399 | 8/1987 | Reimann . |
| 4,744,224 | 5/1988 | Erickson . |
| 5,024,063 | 6/1991 | Erickson . |
| 5,157,942 | 10/1992 | Dao . |
| 5,174,129 | 12/1992 | Kondo ........................................ 60/476 |
| 5,271,235 | 12/1993 | Phillips et al. . |
| 5,339,654 | 8/1994 | Cook et al. . |
| 5,367,884 | 11/1994 | Phillips et al. . |
| 5,548,971 | 8/1996 | Rockenfeller et al. . |

OTHER PUBLICATIONS

Erickson, D.C., et al., "GAX Absorption Cycles–Recent Developments Have Sparked Renewed Interest", IEA Heat Pump Centre Newsletter, vol. 10, No. 4, (Dec. 1992).

Modahl, R.J., et al., "Evaluation of a Commercial Advanced Absorption Heat Pump Breadboard", pp. 117–125 (1988).

Chemical Sector Allied Corp. "Developement of a Residual Gas Fired Absorption Heat Pump", Final Report, pp. 2–1–2–9; (Aug. 1985).

*Primary Examiner*—William Doerrler
*Attorney, Agent, or Firm*—Speckman Pauley Petersen & Fejer

[57] ABSTRACT

The absorption step of a continuous absorption cycle apparatus (refrigerator or heat pump) is externally cooled by an air-cooled thermosyphon having hot end 107 (FIG. 1), air-cooled end 115, and reservoir 123. The absorption step is further recuperatively cooled by internal fluids, in absorber heat exchanger 108 and/or GAX 109. Thus the absorber is highly compact and the cycle is highly efficient. A hotter hermetic thermosyphon can advantageously supply additional cooling.

23 Claims, 5 Drawing Sheets

THERMOSYPHON COOLED ABSORBER FOR AIR COOLED ABSORPTION CYCLES

This application is a continuation of copending application(s) Ser. No. 08/406,159 filed on Mar. 17, 1995

BACKGROUND OF THE INVENTION

1. Field of the Invention

This invention relates to absorption refrigeration and absorption heat pump systems. It has particular applicability to air cooled systems and also to systems which are switchable between heat pumping mode and cooling mode. It also has particular applicability to absorption cycles wherein the absorber has a large temperature glide, e.g. the "generator-absorber heat exchange" (GAX) cycles.

2. Description of Related Art

Small scale air-cooled absorption air conditioning has been a practical reality now for over thirty years. However its market share has been miniscule due to the low Coefficient of Performance (COP) and the high capital cost.

A higher efficiency, lower capital cost air-cooled absorption cycle would be desirable, not only for air conditioning, but also for heat pumping and for refrigeration, due to the environmental benefits and the energy conservation benefits. The GAX family of absorption cycles has the potential to provide those benefits.

Current practice in this field consists of air conditioning equipment having a direct air-cooled condenser, a direct air-cooled absorber, and a single hydronic circuit which delivers cooling from the evaporator to the conditioned space. The direct air-cooled absorber is typically cocurrent downflow. One design has three downflow segments—the first segment is divided into two parallel paths, the other two are combined into a single path, and uphill legs join each segment.

Direct air-cooled absorbers present several problems which make them bulky, inefficient, and costly. Most of the absorption occurs in long horizontal tube sections. If the flow is high enough to cause turbulence, the pressure drop is excessive; otherwise, the stratified quiescent flow has a very low transfer coefficient. Also the total quantity of absorbent necessary to adequately fill all the tubes is excessive.

The current practice is described in U.S. Pat. No. 3,481,150, 3,514,971, 3,690,121, 3,742,726, and 4,127,010.

The current practice of direct air-cooled absorption is also not well suited to absorption heat pumping, with changeovers between summer cooling mode and winter heating mode. That is because in the heat pump mode the absorption heat must be delivered to the heated space. Thus the large expensive air-cooled absorber must be valved off in the winter, and a separate heat recovery absorber must be provided.

One prior art proposed solution to the above problems is the double hydronic circuit. This has been disclosed variously in U.S. Pat. No. 5,339,654 and U.S. Pat. No. 5,367,884. One hydronic circuit and pump serves an indoor coil, and a second hydronic circuit and pump serves an outdoor coil (in heat exchange relation with ambient air). In the cooling mode, the indoor circuit connects to the cold component(s)—the evaporator(s), and the outdoor circuit to the warm components—the condenser and absorber. In the heat pumping mode, two or three 4-way valves (or equivalently an 8-way valve) actuate to reverse the connections.

The double hydronic approach makes possible a very compact monovariant sealed absorption system. i.e. one with no internal mode change. However it also introduces several serious disadvantages. First is the extra hydronic pump, circuit, and change valve. Secondly are the additional temperature differentials of the added hydronic circuit which must be overcome. These act to decrease the temperature overlap in GAX cycles, which in turn directly decreases COP. Thirdly, since the added hydronic circuit serves an outdoor coil and hence must be pumpable in the coldest condition, the new circuit has high glycol content and hence poor pumping and heat transfer characteristics. However the indoor circuit must use the same heat transfer fluid, thus its heat exchange is also penalized. In contrast, with a single hydronic circuit only serving the indoor coils, the heat transfer fluid merely must avoid complete freezing at the coldest temperature.

There are several prior art disclosures of the use of thermosyphons in continuous absorption cycles. In two examples, U.S. Pat. No. 4,567,736, and 4,573,330, external heat is delivered from a heat source to a generator via thermosyphon. In another case, U.S. Pat. No. 4,688,399, heat is transferred internally from an absorber to a generator. Three hermetically separate thermosyphons are disclosed, each having horizontally oriented heat transfer zones. The height relationship of the three thermosyphons is inverted in the two components to take advantage of temperature glide.

Thermosyphon cooling of the absorber has been commonly practiced in intermittent absorption cycles. Intermittent absorption cycles are those which have a generator/absorber component which functions as a generator during one part of the cycle and then as an absorber during another part. In contrast, in continuous cycles the generator and absorber are separately provided and never trade functions. In many intermittent cycles the condenser associated with a generator is changed to a thermosyphon cooling device when the generator changes function to an absorber. Examples of this are found in U.S. Pat. No. 2,446,636, 2,452,635, and 4,744,224.

What is needed, and among the objects of this invention, is a means of providing the benefits of air cooling to an absorption cycle absorber, without the disadvantages of a cold hydronic circuit, and without the disadvantages of direct air-cooled absorption. A further object is to provide an air-exchanged absorption heat pump which does not have the disadvantages of an idle air-cooled absorber in the heat pump mode, nor require a cold hydronic circuit.

DISCLOSURE OF INVENTION

These and other objects are achieved by apparatus and corresponding process whereby cooling is provided to the externally cooled portion of the absorber of a continuous absorption cooling device, and the thermosyphon is directly air-cooled. That is, the warm end of the thermosyphon cools the absorber, and the cold end is cooled by air. This permits the absorber to be very compact, without imposing any impediment on the air-cooled component design. The thermosyphon fluid can be selected for excellent transfer coefficient, making the absorber cooling highly effective, while at the same time the absorber is not limited to the relatively less efficient cocurrent flow.

When the absorber is designed for counter-current or cross-current absorption, whereby a large temperature glide is present in the heat release from the absorber, further advantages are obtainable by providing multiple hermetically individual thermosyphons for the absorber at different temperature locations. Air cooling is then provided to the cold ends of the thermosyphons in increasing temperature order. The increased temperature differential of the air enables substantially reduced air flow rates, thus saving parasitic power. Also the average coil-to-air temperature differential is larger, permitting smaller coil surface area.

Further advantages are obtainable when the air coil of the (coldest) thermosyphon is integrated with a direct air-cooled condenser. Thus a single larger air component is provided rather than two separate reduced size components. The heat load will always thereby optimally divide between the two functions, and only a single charging operation is required.

In the integrated configuration, due regard must be paid to the need for a flow configuration which keeps the liquid well mixed. Otherwise, e.g. for $NH_3$—$H_2O$ absorption working fluid, the $H_2O$ content could build up and impede the thermosyphon action. Mixing is accomplished by having two phase fluid exit the top of the thermosyphon warm end, and then communicate with the liquid withdrawn from the condenser. That in turn is caused by a liquid leg approximately as high as and connected to the bottom of the warm end. The heat exchange section should have a continuous uphill slope to promote mixed flow. A reservoir vessel is conveniently supplied for the above functions: commingling of liquids, vapor liquid separation, and supply of liquid to the liquid leg.

When the absorption cooling device is switchable to a heat pumping mode. further advantages are obtainable by providing a second means for removal of absorption heat in the absorber, e.g. a hydronic coil, which is activated in the heat pumping mode. The thermosyphon is deactivated in that mode. The preferred method of deactivation is an isolation valve at the top of the warm end. Still further advantages are then obtainable by converting the otherwise idle air-cooled end of the thermosyphon to an air-exchanged evaporator.

BEST MODE FOR CARRYING OUT THE INVENTION

Figure 1:
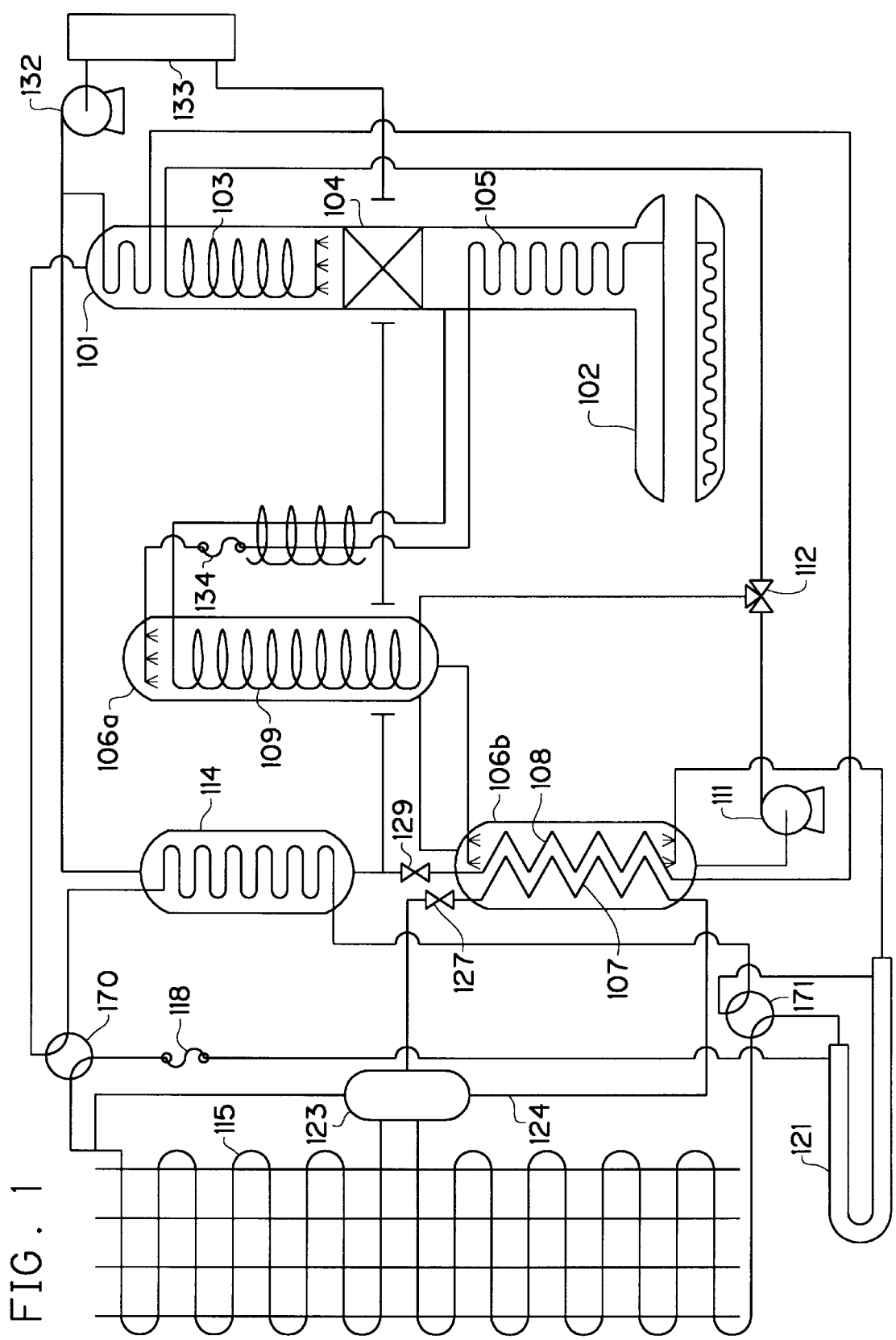
FIG. 1 is a first embodiment of the invention as applied to a GAX cycle absorption heat pump, showing a first mode change configuration for cooling/heat pumping switchover.

Referring to FIG. 1, a basic GAX cycle absorption heat pump apparatus is depicted which incorporates absorber cooling via air cooled thermosyphon in the cooling mode, using a thermosyphon cold end which is integrated with the air cooled condenser, and which is changeable to air cooled evaporator in the heat pump mode. Generator vessel 101 is comprised of externally heated section 102, solution cooled rectification section (SCR) 103, adiabatic rectification section 104, and generator heat exchange (GHX) section 105. The externally cooled section of the absorber 106b is comprised of a thermosyphon warm end heat exchanger 107 and a hydronic exchanger 108. The internally cooled absorber section 106a contains an exchanger 109 which accomplished absorber heat exchange (AHX) and also, at lower lifts, GAX desorption. After absorption, the resulting weak absorbent is pumped to generator pressure by pump 111 and then routed partly to SCR 103 and partly to exchanger 109, as controlled by means for flow split 112. Both streams ultimately arrive at generator 101 where they are desorbed and rectified. Strong absorbent (in the case of ammonia-water pair, nearly pure water) is withdrawn from the hot end of generator 102, cooled in GHX 105, reduced in pressure by letdown 134, and sprayed into absorber column 106a at the warm end (top).

Rectified vapor from the generator is routed to 4-way control valve 170, and then according to mode is directed either to hydronic exchanged vessel 114 (heat pump mode) or air exchanged component 115 (cooling mode). The condensate from the bottom of the selected vessel is routed to 4-way valve 171, and thence to refrigerant heat exchanger 121 and pressure letdown 118. From there it returns to valve 170, for routing to the opposite vessel, serving thereby as an evaporator. Vapor from that vessel is routed by 4-way valve 171 to the other side of RHX 121, and thence to absorber 106b.

In the cooling mode, reservoir 123 supplies liquid condensate to leg 124 and thence to thermosyphon warm end exchanger 107. Two phase mixture returns to reservoir 123, where it is phase separated. When the mode changes to heat pump mode, both valves 170 and 171 change position, and valve 127 closed to deactivate the thermosyphon. At the same time, hydronic circuit valve 129 opens to allow hydronic loop cooing of the absorber. Hydronic pump 132 circulates liquid which picks up both absorption heat and condensation heat and delivers it to heated space 133.

Figure 2:
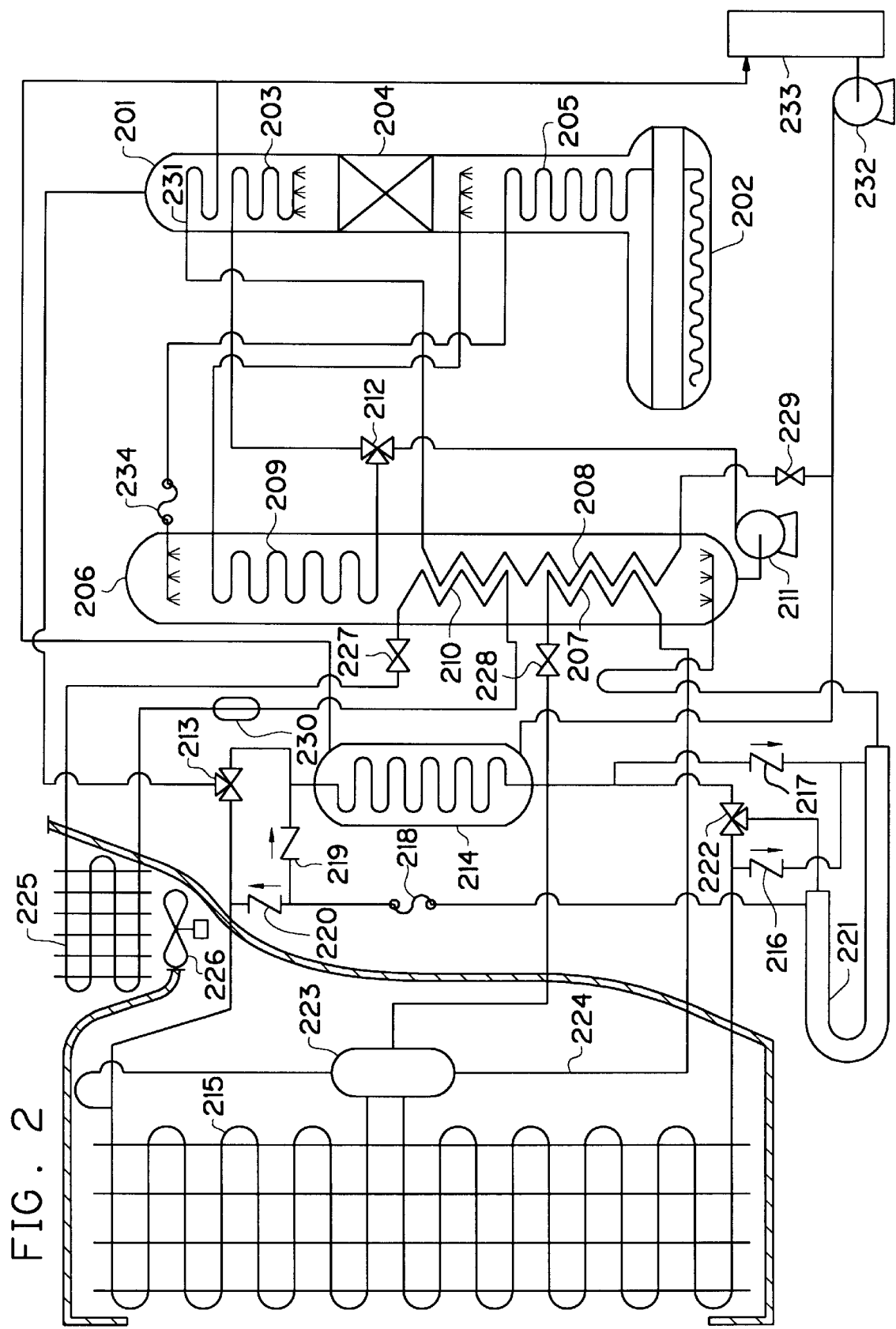
FIG. 2 is a GAX cycle absorption heat pump with a second mode change configuration and FIG. 3 is a Branched GAX cycle absorption heat pump with a third mode change configuration.

FIG. 2 illustrates an air-exchanged GAX cycle absorption heat pump with a single vessel absorber, single vessel generator, single hydronic circuit, two convertible condenser/evaporators, and double thermosyphon cooling of the absorber. The colder thermosyphon is integrated with the air-cooled condenser, and mode change is via two 3-way valves plus four check valves whereby both condenser/evaporators are always cocurrent downflow.

The generator-rectifier vessel 201 is comprised of an externally heated section 202, and a solution cooled rectifier section 203, an adiabatic rectification section 204, and a generator heat exchanger section 205. The absorber vessel 206 is comprised of an externally cooled section which includes a first thermosyphon cold end 207, a hydronic heat exchanger 208, and a second thermosyphon warm-end 210, at a higher (warmer) location than the first. The absorber also includes GAX desorption heat exchanger 209. An absorbent solution pump 211 pressurizes the weak solution (fully absorbed) and routes it partly to GAX exchanger 209 and partly to SCR 203 via means for flow control 212. Strong solution (having high affinity for the refrigerant) is routed from the externally heated generator 202 via GHX 205 and means for pressure letdown 234 to absorber 206.

Rectified refrigerant vapor from generator 201 is routed to 3-way valve 213 which, dependent upon mode selected, routes it to hydronic exchanged component 214 (heat pump mode), or to air exchanged component 215 (cooling mode). Condensate from the bottom of the selected component is routed via either check valve 216 or 217 through refrigerant heat exchanger 221, refrigerant pressure letdown device 218, and then via check valve 219 or 220 into the lower pressure component 214 or 215 (i.e. the one which is not currently selected as condenser). Three-way valve 222 is selected to receive vapor from that lower pressure component, i.e. the evaporator, and route it via RHX 221 to absorber 206.

Thermosyphon warm end 207 provides cooling to the absorber in the cooling mode. Reservoir 223 supplies liquid to liquid leg 224, which connects to the bottom of exchanger 207. Exchanger 207 has an uphill slope whereby two phase mixture exits the top and returns to reservoir 223, where the vapor and liquid are separated. The upper section of air exchanged component 215 serves predominantly as the thermosyphon cold end in the cooling mode, and both vapor and liquid spill over from reservoir 223 to the lower section, where the bulk of the condensation occurs. Thermosyphon exchanger 210 is cooled by thermosyphon cold end 225 in the cooling mode. Fan 226 routes cooling air sequentially first through air exchange component 215 and then through air-cooled thermosyphon cold end 225.

In the heat pumping mode, the two thermosyphons are deactivated by shutting valves 227 and 228 respectively, and hydronic coil 208 is activated by opening valve 229. Reservoir 230 may be provided to hold thermosyphon liquid forced out of exchanger 210. In the heat pumping mode additional cooling is provided for rectification by hydronic exchanger 231. Hydronic pump 232 circulates the heat transfer fluid (typically aqueous glycol solution) through the selected exchangers and then to indoor coil 233.

Figure 3:
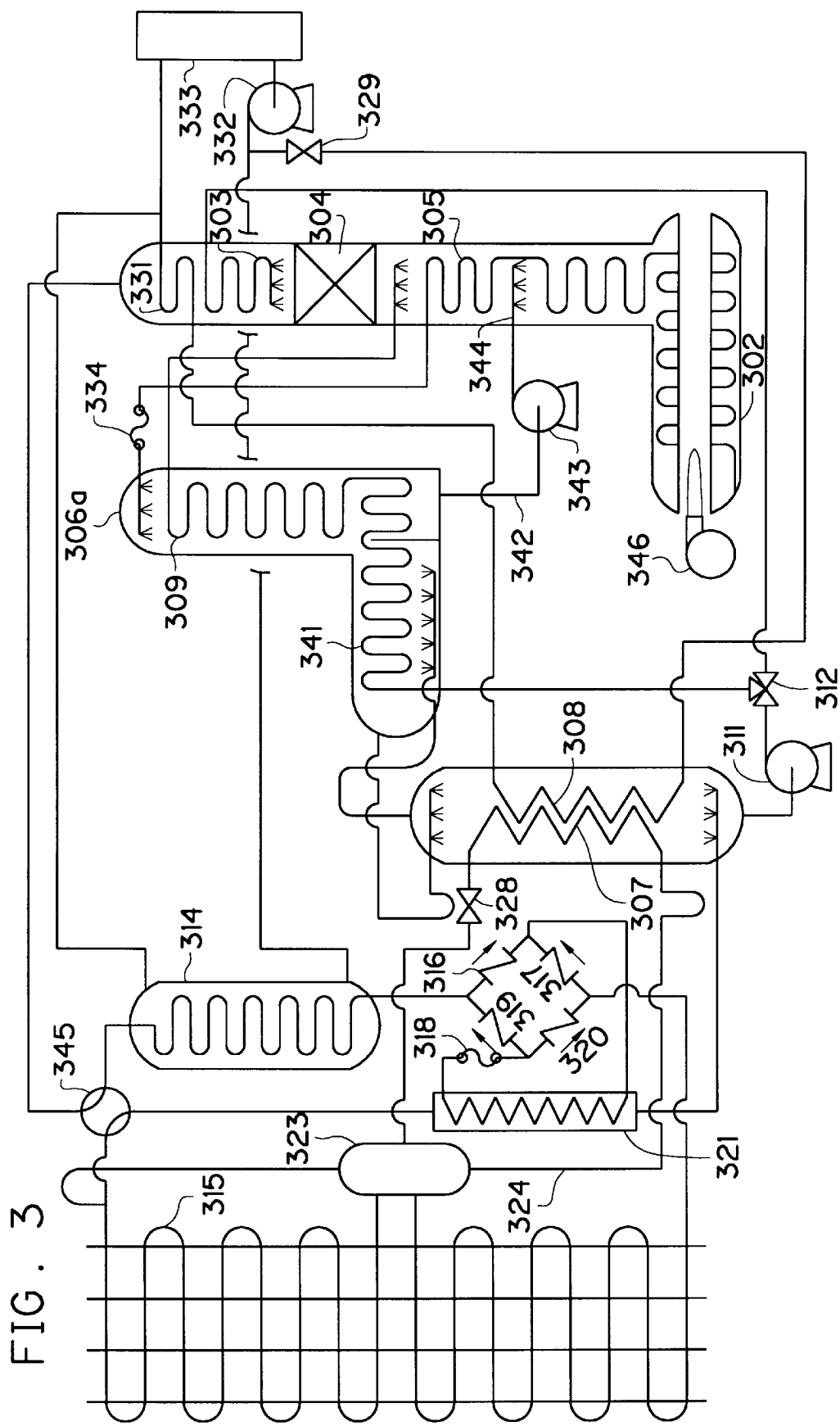

FIG. 3 illustrates a Branched GAX absorption heat pump with a single hydronic circuit serving indoor coil 333, and with direct air exchange component 315 which is convertible between an evaporator in heat pump mode and an integrated condenser plus thermosyphon cold end in cooling mode. Three-hundred series numbered components have the same description as their two-hundred series counterparts.

The internally cooled absorber section 306a includes an absorber heat exchanger 341, GAX desorption exchanger 309, and liquid withdrawal tap 342 from between them. Withdrawn liquid is pumped to generator pressure by pump 343 and then injected into the generator at injection port 344. Burner 346 supplies heat to the externally heated section 302 of the generator. The changeover of the two condenser/evaporators 314 and 315 is accomplished via single 4-way valve 345, in conjunction with four check valves. The vapor connections to both convertible components are at the top: the condenser is cocurrent downflow and the evaporator is cocurrent upflow.

Figure 4:
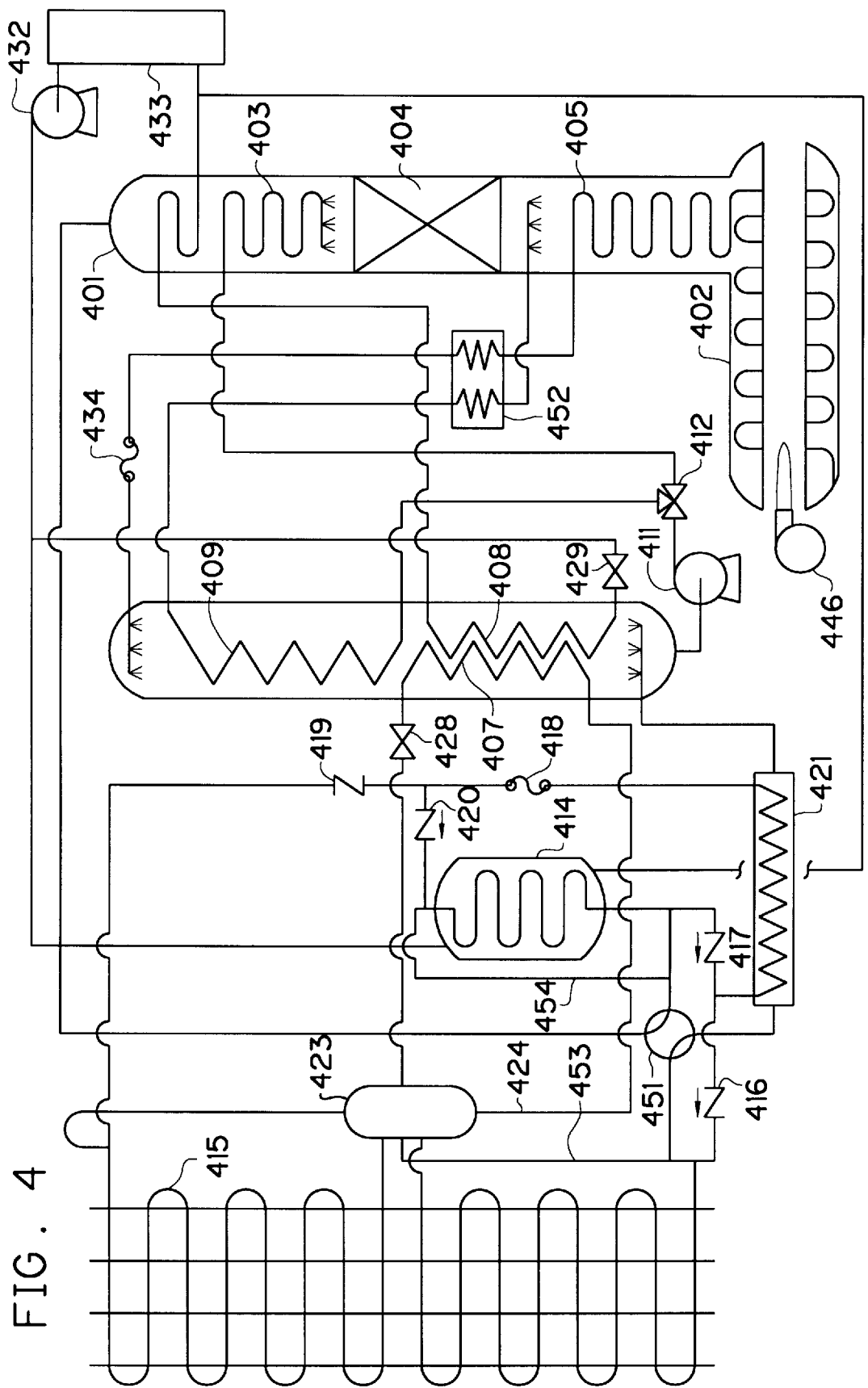
FIG. 4 is a basic GAX cycle heat pump with yet another mode change configuration.

FIG. 4 depicts a basic GAX cycle absorption heat pump with yet another mode change configuration and arrangement of components. The four-hundred series numbered components have the same description as the corresponding two or three-hundred series. In FIG. 4 a single 4-way valve 451 is supplied at the bottom end of the two convertible components 414 and 415. Thus as evaporators both components have cocurrent downflow, whereas as condensers both components have downflow liquid but upflow vapor, offset somewhat by pressure equalization legs 453 and 454. Also the GHX is comprised of both internal section 405 and external section 452.

Figure 5:
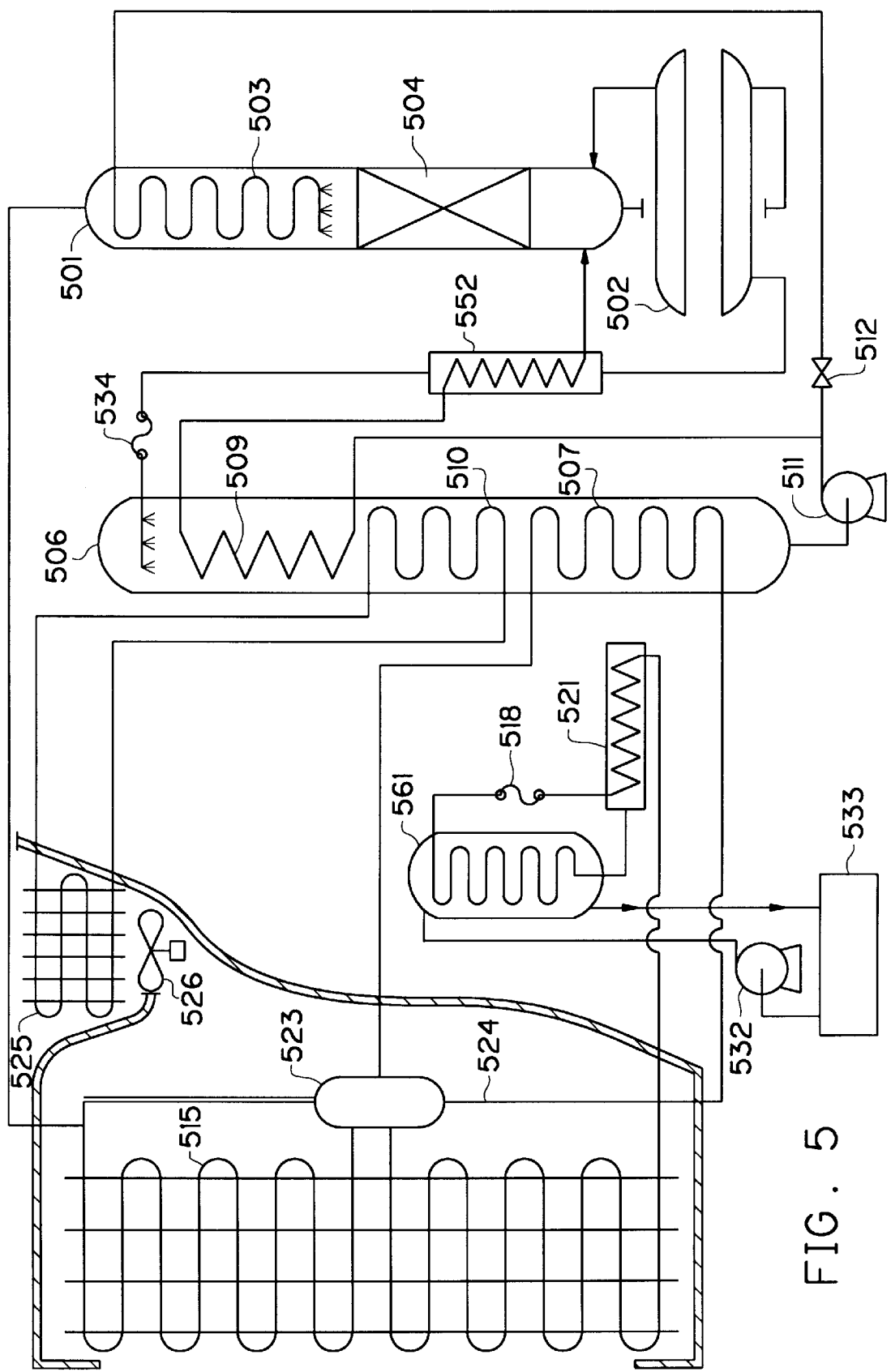
FIG. 5 is a basic GAX cycle absorption cooler, i.e. without mode change.

FIG. 5 illustrates a basic GAX cycle absorption cooling system. Air exchanger 515 is both a direct contact condenser and also the cold end of thermosyphon 507 which provides external absorber cooling. A single hydronic circuit delivers the cooling from evaporator 561 to cooled space 533. No mode change is required. The externally fired portion of the generator 502 is shown as a separate vessel. Other descriptions are as appeared earlier for similarly numbered components.

I claim:

1. A continuous cycle absorption cooling apparatus which is comprised of an externally cooled absorber; a first direct air-cooled thermosyphon comprised of a warm end which is a means for heat removal from said absorber; an absorbing solution, a pump for circulating said solution; an internally cooled absorber; and a means for transferring heat from said internally cooled absorber to said solution discharged from said pump.

2. The apparatus according to claim 1 wherein said thermosyphon is additionally comprised of a vapor communication path and a liquid communication path between said warm end and said direct air-cooled end, and wherein said paths are continuously open.

3. A continuous cycle absorption cooling, apparatus which is comprised of an externally cooled absorber and a first direct air-cooled thermosyphon comprised of a warm end which is contained in and a means for heat removal from said absorber, a direct air-cooled condenser and wherein the condenser and the air-cooled end of the thermosyphon are in fluid communication.

4. The apparatus according to claim 3 additionally comprised of a vapor liquid separator vessel connected to a mid-height of an air-cooled component comprised of the condenser and the air-cooled thermosyphon, and a liquid path connecting the bottom of the vessel to the bottom of the thermosyphon warm end.

5. A continuous cycle absorption cooling apparatus which is comprised of an externally cooled absorber and a first direct air-cooled thermosyphon comprised of a warm end which is contained in and a means for heat removal from said absorber, an additional section of externally cooled absorber, plus a second direct air-cooled thermosyphon which is hermetically separate form the first one and which is comprised of a warm end which is contained in and a means for heat removal from said additional section.

6. A continuous cycle absorption cooling apparatus which is comprised of an externally cooled absorber and a first direct air-cooled thermosyphon comprised of a warm end which is contained in and a means for heat removal from said absorber, a second heat exchanger which is contained within and a second means for heat removal from said externally cooled absorber, plus a hydronic circuit for removal of heat from said second heat exchanger.

7. The apparatus according to claim 6 additionally adapted for heat pumping and additionally comprised of a means for cutout of the thermosyphon in the heat pump mode and a means for cutout of the second heat exchanger in the cooling mode.

8. The apparatus according to claim 7 additionally comprised of a direct air-cooled condenser which is in fluid communication with the direct air-cooled portion of said thermosyphon, jointly comprising an air exchanged component.

9. The apparatus according to claim 8 additionally comprising means for converting said air-exchanged component into an evaporator in the heat pump mode.

10. An absorption heat pump apparatus having an air conditioning (cooling) mode and a heat pumping mode comprised of:
a) a component adapted for heat exchange with ambient air;
b) an externally cooled absorber comprised of a first means for heat exchange; and
c) a multiplicity of valves which cause said component to be an absorption heat pump evaporator in the heat pumping mode, and cause it to be in the cooling mode a combination absorption heat pump condenser plus the cold end of a thermosyphon comprised of said first means for heat exchange.

11. The apparatus according to claim 10 additionally comprised of a second means for heat exchange with said externally cooled absorber; and a hydronic circuit which delivers heat from said second means to a heat load in the heat pumping mode.

12. The apparatus according to claim 11 additionally comprised of a convertible condenser/evaporator containing a third means for heat exchange which is connected to said hydronic circuit in both modes.

13. The apparatus according to claim 12 additionally comprised of a single refrigerant heat exchanger and means for pressure letdown plus means for flow control, which in the heat pump mode causes them to accept refrigerant from the hydronic condenser and send it to the air-cooled evaporator, and in the cooling mode causes them to accept refrigerant from the air-cooled condenser and send it to the hydronic evaporator.

14. The apparatus according to claim 10 additionally comprised of a liquid-vapor separator vessel connected to a mid-height of said component; a liquid line connecting the bottom of said separator to the bottom of said first means for heat exchange; a vapor line connecting the top of said first means for heat exchange to said vessel; and a cutout valve in said vapor line.

15. The apparatus according to claim 14 wherein said vessel is located at least partly above the top of said first means.

16. The apparatus according to claim 10 additionally comprised of a second air-cooled thermosyphon for cooling said externally cooled absorber, wherein the air-cooled sections of said thermosyphons are arranged in series air flow.

17. A process for absorption cooling comprising:
 a) evaporating a refrigerant to produce said cooling;
 b) absorbing said evaporated refrigerant in an absorbent solution;
 c) removing heat from said absorbing step via a first thermosyphon;
 d) directly cooling said thermosyphon with ambient air; and
 e) separately removing heat from said absorbing step by transferring said heat to pressurized absorbent solution.

18. The process according to claim 17 additionally comprising separately removing heat from said absorbing step by transferring said heat to a hydronic heating circuit.

19. The process according to claim 17 additionally comprising integrating said thermosyphon with a condenser for vapor desorbed from said absorbent solution.

20. The process according to claim 17 additionally comprising separately removing heat from said absorbing step via a second thermosyphon which is at a higher temperature than the first thermosyphon; and cooling said second thermosyphon with said air which has already cooled said first thermosyphon.

21. The processes according to claim 19 additionally comprising recirculating liquid through the warm end of said thermosyphon and commingling said liquid with condensate from said condenser.

22. A continuous absorption cooling apparatus comprised of:
 a) an air-cooled condenser;
 b) an absorber which is cooled by a thermosyphon which is in fluid communication with said condenser;
 c) an evaporator; and
 d) a path for transport of liquid refrigerant from said thermosyphon to said evaporator.

23. The apparatus according to claim 22 wherein said thermosyphon connects to a mid-height of said condenser.

* * * * *